(12) United States Patent
Visser

(10) Patent No.: US 11,510,374 B2
(45) Date of Patent: Nov. 29, 2022

(54) OUTER POT FOR AN INNER PLANT POT TO GROW PLANTS IN AN EBB-AND-FLOOD WATERING SYSTEM

(71) Applicant: Waterwick B.V., 's-Gravendeel (NL)

(72) Inventor: Anthony Visser, 's-Gravendeel (NL)

(73) Assignee: Waterwick B.V., 's-Gravendeel (NL)

( * ) Notice: Subject to any disclaimer, the term of this patent is extended or adjusted under 35 U.S.C. 154(b) by 0 days.

(21) Appl. No.: 17/413,074

(22) PCT Filed: Dec. 10, 2019

(86) PCT No.: PCT/NL2019/050822
§ 371 (c)(1),
(2) Date: Jun. 11, 2021

(87) PCT Pub. No.: WO2020/122715
PCT Pub. Date: Jun. 18, 2020

(65) Prior Publication Data
US 2022/0022392 A1 Jan. 27, 2022

(30) Foreign Application Priority Data
Dec. 12, 2018 (NL) ........................................ 2022183

(51) Int. Cl.
*A01G 27/06* (2006.01)
(52) U.S. Cl.
CPC .................................. *A01G 27/06* (2013.01)
(58) Field of Classification Search
CPC ........ A01G 27/06; A01G 27/04; A01G 27/02; A01G 27/006; A01G 27/00; A01G 27/005; A01G 9/04; A01G 9/047; A01G 9/02
See application file for complete search history.

(56) References Cited

U.S. PATENT DOCUMENTS

| 608,590 | A | * | 8/1898 | Freund | ................... | A01G 9/024 47/75 |
| 4,023,308 | A | * | 5/1977 | Staby | ..................... | A01G 29/00 47/79 |

(Continued)

FOREIGN PATENT DOCUMENTS

| EP | 0395166 A1 | 10/1990 |
| WO | 2017171543 A1 | 10/2017 |

OTHER PUBLICATIONS

International Search Report and Written Opinion for the International Patent Application No. PCT/NL2019/050822, dated Mar. 9, 2020, 17 pages.

*Primary Examiner* — Ebony E Evans
*Assistant Examiner* — Katelyn T Truong
(74) *Attorney, Agent, or Firm* — KDB Firm PLLC

(57) ABSTRACT

An outer pot configured to accommodate an inner plant pot. The outer pot includes a bottom and at least one side wall extending from the bottom to an opening configured to enable inserting the inner plant pot through the opening. The outer pot is configured for use in an ebb-and-flood grow system, in that: the bottom and the side wall define there between a fluid reservoir. A dome extending from the bottom and the side wall includes at least one through hole for fluid supply to or fluid discharge from the outer pot, where the through hole is arranged at a distance from the bottom to define a volume of the reservoir. Assemblies, ebb-and-flood based watering systems, methods of assembling and growing plants, associated with the outer pot.

21 Claims, 8 Drawing Sheets

(56) References Cited

U.S. PATENT DOCUMENTS

| | | | | |
|---|---|---|---|---|
| 4,356,665 | A | * | 11/1982 | de Oliveira ............ A01G 27/04 47/80 |
| 5,459,960 | A | * | 10/1995 | Manlove ................ A01G 24/60 47/65.5 |
| 9,504,208 | B2 | * | 11/2016 | Adolf ...................... A01G 9/02 |
| D845,758 | S | * | 4/2019 | Van Wingerden ............. D9/429 |
| 2003/0106262 | A1 | * | 6/2003 | Lai ........................ A01G 27/02 47/65.6 |
| 2005/0254929 | A1 | | 11/2005 | Proctor |
| 2010/0218422 | A1 | | 9/2010 | Eckert |
| 2011/0258925 | A1 | * | 10/2011 | Baker .................... A01G 9/023 47/65.8 |
| 2014/0083009 | A1 | * | 3/2014 | Panopoulos ............. A01G 9/02 47/62 R |
| 2014/0311027 | A1 | | 10/2014 | Contillo et al. |
| 2017/0202161 | A1 | * | 7/2017 | Eckert ................... A01G 27/06 |
| 2018/0228100 | A1 | * | 8/2018 | Gergek ................ A01G 27/003 |
| 2018/0352762 | A1 | * | 12/2018 | Jones ..................... A01G 27/02 |
| 2020/0245567 | A1 | * | 8/2020 | Travaglini ............... A01G 9/24 |

\* cited by examiner

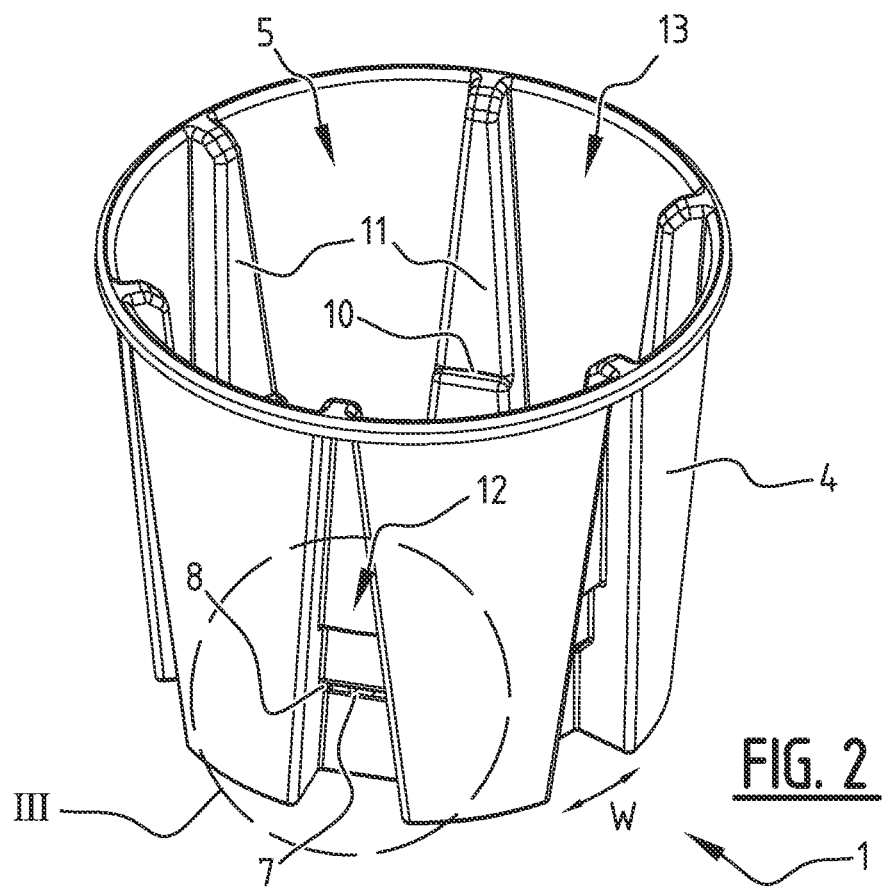

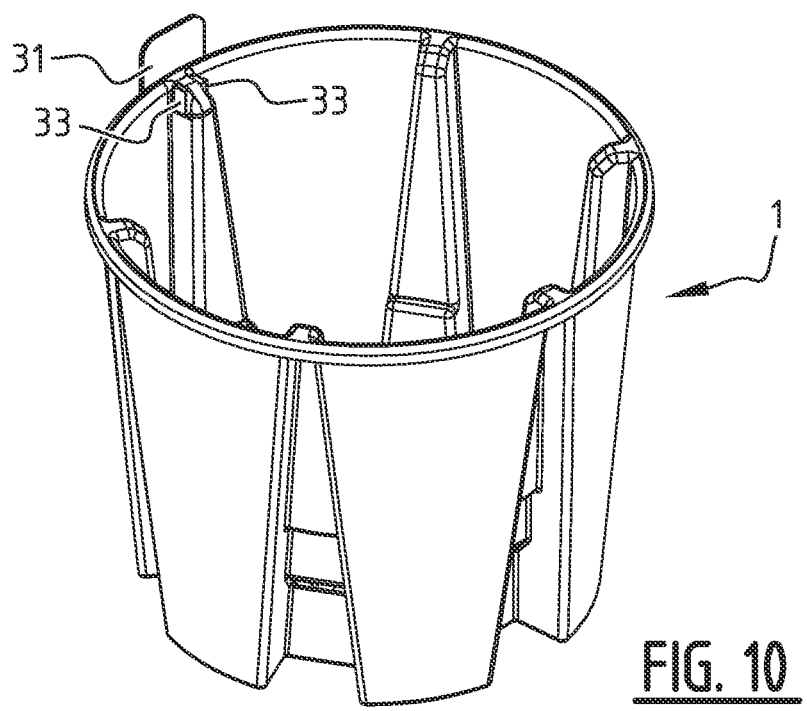
FIG. 10
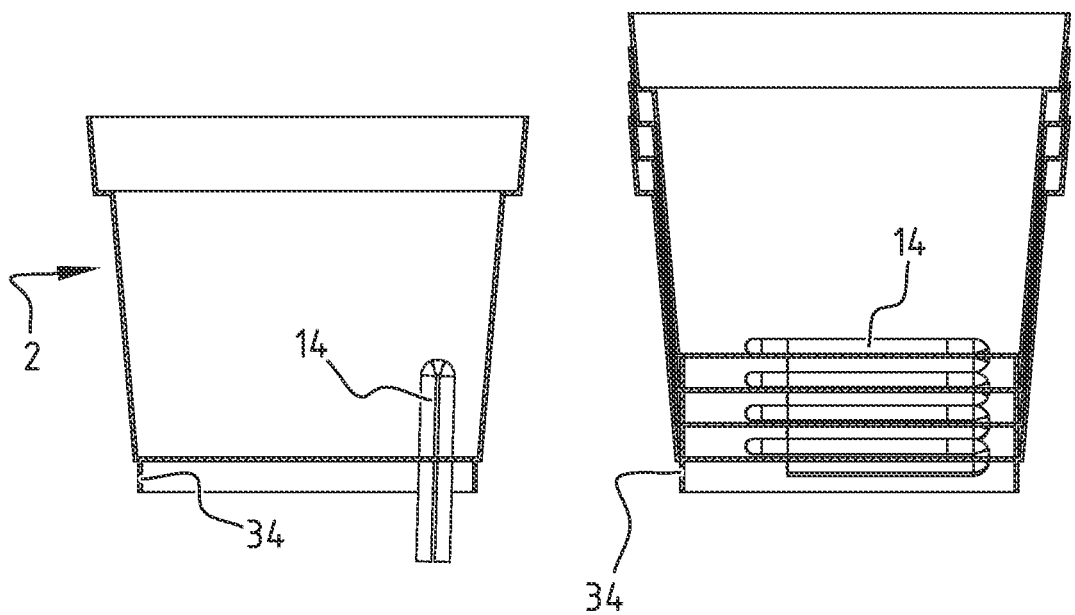
FIG. 11
FIG. 12

OUTER POT FOR AN INNER PLANT POT TO GROW PLANTS IN AN EBB-AND-FLOOD WATERING SYSTEM

This is a national stage application filed under 35 U.S.C. § 371 of pending international application PCT/NL2019/050822, filed Dec. 10, 2019, which claims priority to Netherlands Patent Application No. 2022183, filed Dec. 12, 2018, the entirety of which applications are hereby incorporated by reference herein.

The present application relates to an outer pot, configured to accommodate an inner plant pot, where the outer pot comprises:
a bottom; and
at least one side wall extending from the bottom to an opening configured to enable inserting the inner plant pot through the opening.

Such outer pots are conventionally and commercially available. However, such conventional outer pots have to date not yielded any true improvements by use in for instance an ebb-and-flood grow system, in terms of reducing plant mortality or accelerating plant development to maturity.

An ebb-and-flood grow system in the sense of the present disclosure allows reservoirs in a plurality of outer pots to be replenished simultaneously. According to the present disclosure, the bottom and the side wall of the outer pot define there between a fluid reservoir, which may be replenished by the ebb-and-flood grow system. However, plant maturing times are low or at least not faster than prior techniques. Further, prior techniques suffer from algae growth, root rot, and similar issues.

With an objective of providing an improvement over the prior techniques, it is proposed in the present disclosure that at least one of a dome extending from the bottom and the side wall comprises at least one through hole for fluid supply to or fluid discharge from the outer pot, where the through hole is arranged at a distance from the bottom to define a volume of the reservoir.

To address plant mortality in general, and algae development in particular, an outer pot according to the present disclosure may have the through hole arranged in a step in the side wall which step is oblique or transverse relative to a center axis of the outer pot to block incident light from falling through the through hole into fluid in the reservoir.

The through hole may be rectangular. This allows water to pass more quickly there through, than through a circular or oval hole, inscribed in the interior of a rectangular shape of the through hole. Such rectangular holes may be considered an invention in their own right, independent of the subject and features of the appended independent claim.

The through hole may be arranged and configured to pass an air flow between a bottom of the inner plant pot and a top level of fluid in the reservoir.

The outer pot may further comprise at least one inner plant pot support; and at least two spacers above the inner plant pot support, defining, with the inner plant pot on the support, there between at least one open moisture and/or air channel along an inside of the side wall and an outside of the inner plant pot. Thereby a further discharge, venting or circulation path is provided. In such an embodiment the side wall and spacers may be shaped and dimensioned, relative to the inner plant pot, to block incident light from falling through the channel into fluid in the reservoir. As a consequence, the reservoir is protected against incident (sun)light and consequently algae development is reduced. Additionally or alternatively, the inner plant pot support may be arranged at a higher distance from the bottom than the through hole.

At least one of the inner plant pot support and the through hole may be comprised in an elongate inward indentation of the side wall, extending in a lengthwise direction in parallel to a center axis of the outer pot. In such and embodiment, the indentation may have a converging width along the side wall away from the bottom, and is open at the bottom, for compact stacking of a plurality of outer pots.

The present disclosure further relates to an assembly of the above referenced outer pot and an inner plant pot. Such an aspect may be considered an invention in its own right, independent of the subject and features of the appended independent claim.

The assembly may preferably further comprise a wick arranged in the inner plant pot and extending from a bottom of the inner plant pot to the reservoir.

Therein, the assembly may further comprise a wick inserting device, with which the wick is inserted and anchored in an interior of the inner plant pot. Such an aspect may be considered an invention in its own right, independent of the subject and features of the appended independent claim.

The present disclosure further relates to a method of assembling such an assembly, comprising: providing the above referenced outer pot; providing an inner plant pot, filling the inner plant pot with plant substrate, and planting a plant in the substrate; and arranging the inner plant pot in the outer plant pot. Such an aspect may be considered an invention in its own right, independent of the subject and features of the appended independent claim. When the substrate has a sufficient self-carrying cohesion, a separate inner pot may be omitted though, for example when the substrate defines in itself the inner pot and filling thereof, such as a block of stone wool, glass wool, a rigid or brittle material, such as floral foam, known under the brand or product name "oasis", and the like.

In such a method, the wick may be pre-arranged in the inner plant pot, before filling with substrate. Such an aspect may be considered an invention in its own right, independent of the subject and features of the appended independent claim.

Alternatively, the wick may be engaged using a wick inserting device and inserted into the inner plant pot, after filling thereof with substrate. Such an aspect may be considered an invention in its own right, independent of the subject and features of the appended independent claim.

The present disclosure further relates to a method growing plants with at least one above referenced assembly, comprising: providing the assembly in an ebb-and-flood system in which a fluid level is selectively raised or lowered to respectively above and below the through hole; wherein the water level is raised to replenish the reservoir and lowered to allow circulation and venting of air and moisture from the space between fluid in the reservoir and the bottom of the inner plant pot through at least one of the through hole and the channel.

Therein, the method may further comprise heating a floor of the ebb-and-flood system to promote the circulation and venting. Such an aspect may be considered an invention in its own right, independent of the subject and features of the appended independent claim.

The method according to the present disclosure may further involve displacing at least an above discussed outer pot or an above discussed assembly with a fork according to another aspect of the present disclosure. The fork may be configured to transport at least one such outer pot at a time, or more than one such outer pot simultaneously. The fork may comprise a base and a plurality of elongate teeth extending from the base. The teeth preferably have sides relative to the longitudinal direction thereof, which are adapted to at least the outer shape of the above discussed outer pot. Sides of neighboring teeth, facing one another, are straight or slanted in correspondence with respectively a cylindrical or upside down turned frusto-conical outer shape of the side wall of the outer pot. A top edge of the teeth may comprise an edge configured to support a rim at a top of the outer pot. Then, the top edge may comprise a plate. Such a plate may be narrow in comparison with a width of underlying portions of a tooth.

Following the foregoing indication of features of embodiments of the present disclosure in rather generic terms, corresponding with the wordings of the appended claims, herein below exemplary embodiments will be disclosed in more technical detail, referring to the appended drawings, where it is noted, that the scope of protection for the present disclosure is by no means to be limited to specific features of the following description or in the appended drawings, unless the appended independent claims are limited to such features and where it is further noted that even equivalent features relative to those defined in the independent claims are potentially also encompassed by the scope of protection, at least in some jurisdictions. In the appended drawing:

FIGS. 1-5 show an outer pot in accordance with the present disclosure;

FIG. 10 shows an alternative for a label in FIG. 3;

FIGS. 11 and 12 show a single inner pot and a stack of inner pots with wick(s) pre-arranged therein, where such an aspect may be considered an invention in its own right, independent of the subject and features of the appended independent claim:

As indicated above the present disclosure relates to an outer pot 1, but also an assembly with an inner pot 2, an ebb-and-flood based watering system, and diverse methods of assembling the assembly as well as growing plants, based on or at least associated with the configuration, properties, benefits and features of outer pot 1.

Figure 1:
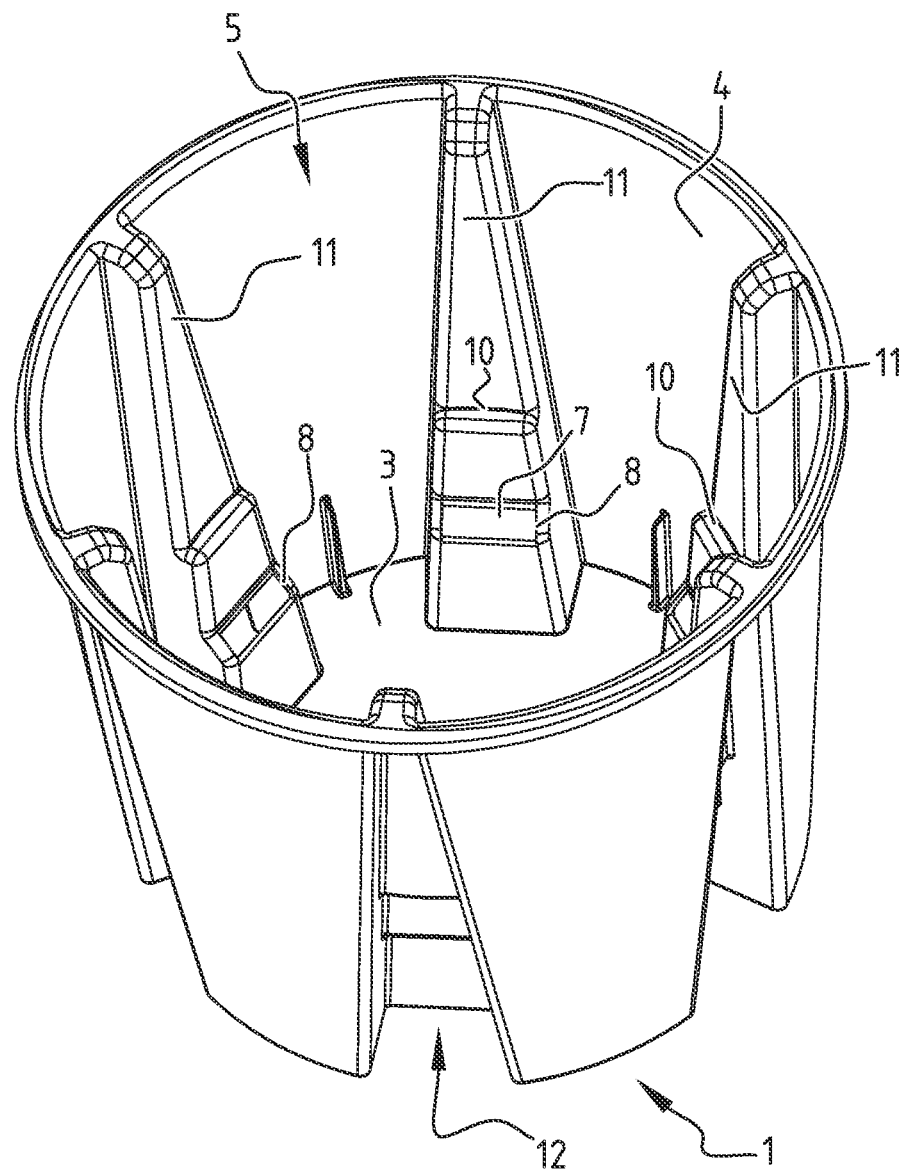
Figure 4:
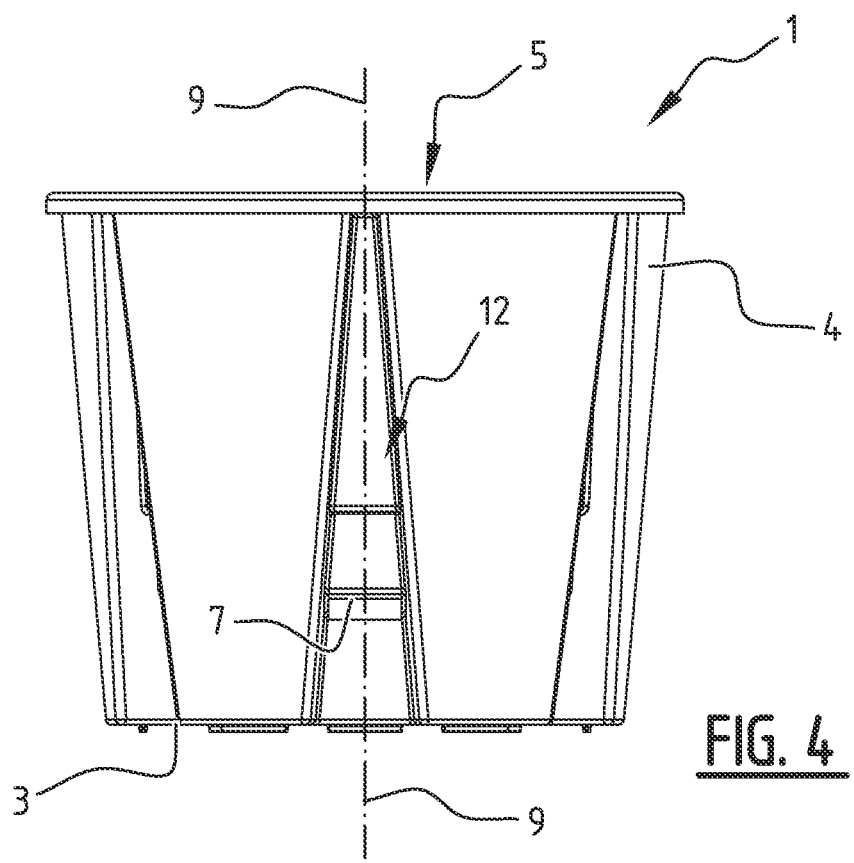
Figure 5:
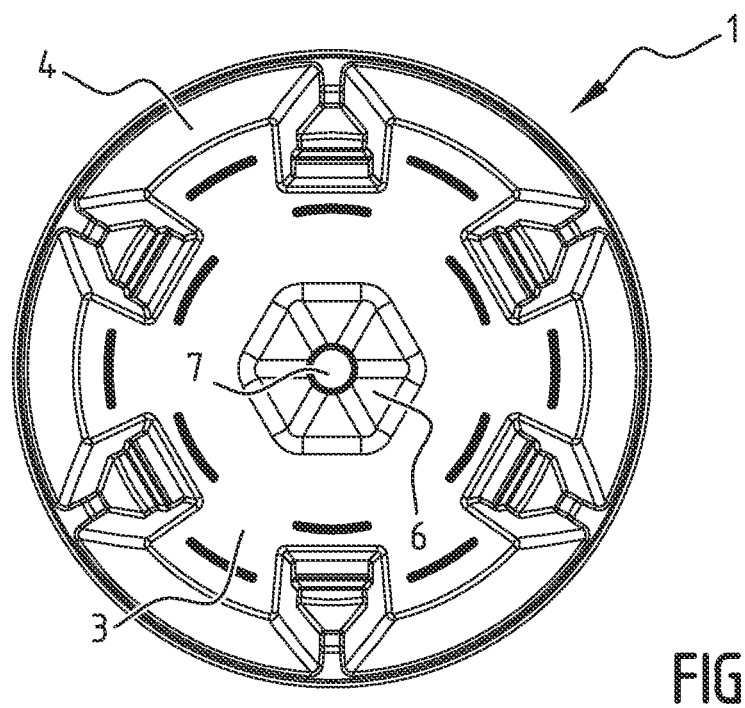
Figure 6:
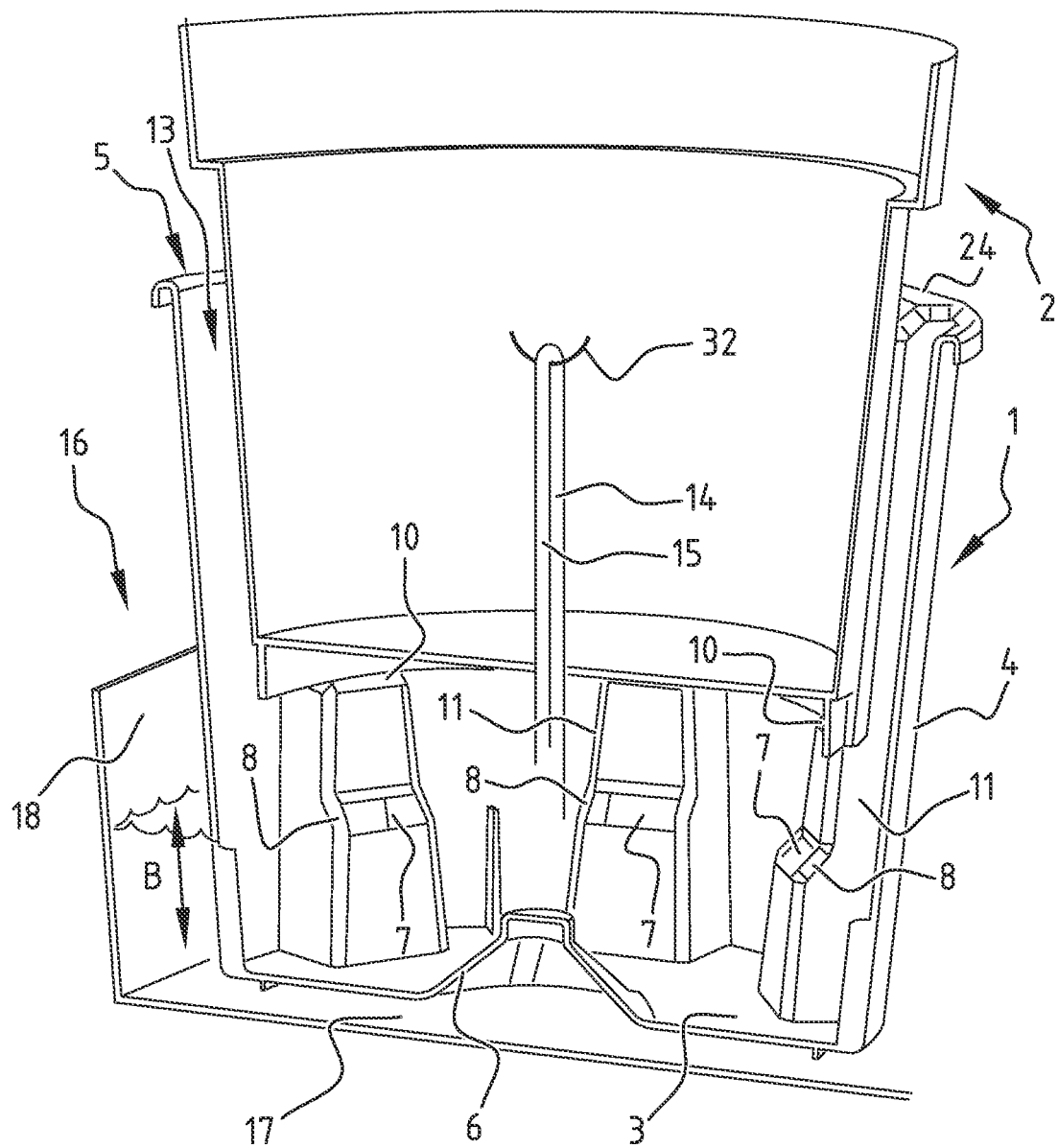
FIG. 6 shows an assembly of the outer pot in the embodiment of FIGS. 1-5 in conjunction with a generically, schematically shown ebb-and-flood based watering system.

FIGS. 1-5 show an outer pot 1 and details thereof, which outer pot 1 is, according to the present disclosure, configured to accommodate an inner plant pot 2. An assembly is shown in FIG. 6. Outer pot 1 comprises a bottom 3 and an at least approximately conical or cylindrical side wall 4, extending from bottom 3 to an opening 5. Opening 5 is configured and at least dimensioned to enable inserting the inner plant pot 2 through the opening 5. Outer pot 1 is configured for use in an ebb-and-flood grow system, as disclosed in more detail herein below. For this, bottom 3 and side wall 4 define there between and in a lower portion of the interior of outer pot 1 a fluid reservoir.

Outer pot 1 may comprise—in bottom 3 thereof—a dome 6 extending from bottom 3 with at least one through hole 7 in a top of dome 6 for fluid supply into or fluid discharge from the reservoir in the interior of outer pot 1. Additionally or alternatively, side wall 4 may comprise at least one through hole 7 for fluid supply into or fluid discharge from the reservoir in the interior of outer pot 1. Through holes 7 in dome 6 or in side wall 4 are arranged at a distance from the bottom to define a volume of the reservoir. A height of a lowermost of the holes 7 in dome 6 and in side wall 4 defines the height of the reservoir, because—in an ebb-and-flood system—a fluid level is raised to above the lowermost of the holes 7, and the fluid level outside the outer pot 1 is then lowered to allow for example water, possibly with additives, as an embodiment of fluid, to run out of holes 7 and leave the reservoir in the interior of outer pot 1 under inner pot 2 filled or replenished. If the hole 7 in or near a top of dome 6 is provided, dome 6 may have a height corresponding with holes 7 in side wall 4. However, if hole 7 in or near the top of dome 6 is relatively small in comparison with an assembled size of the plurality of holes 7 in side wall 4 and below holes 7 in side wall 4, this may have an effect of quick evacuation of fluid though holes 7 in side wall 4 and hole 7 in or near the top of dome 6, after the level around the outer pot 1 is lowered in the ebb-and-flood watering system. After the fluid level inside outer pot 1 lowered to below holes 7 in side wall 4, further draining is performed slower through the smaller hole 7 in or near the top of dome 6. If hole 7 in or near the top of dome 6 is above the level of holes 7 in side wall 4, air supply and/or discharge there through may be realized.

Through holes 7 in side wall 4 are arranged in an inward oriented step 8, extending from side wall 4 into the interior of outer pot 1. Step 8 can be oblique (but could equally well be transverse) relative to a center axis 9 of outer pot 1. Consequently, light incident onto outer pot 1 from above is blocked from falling through the through holes 7 into fluid in the reservoir. Thereby algae growth may be reduced. Likewise, only dome 6 may have at least one hole, and the same objective of reduced algae growth is achieved since no light can penetrate into the reservoir from below dome 6. In such an embodiment, that only dome 6 has at least one hole, outer pot 1 may be set on stands to facilitate supply and/or discharge of air or fluid to/from the reservoir.

In the shown embodiment, the through holes 7 at steps 8 are rectangular. In contrast, hole or holes 7 may have any alternative one or combinations of shapes, such as circular, ellipsoid, and the like. Any shape for any of the through holes 7 is conceivable and may be put into practice.

In the shown embodiment, the through holes 7 are arranged and configured to pass an air flow between a bottom of the inner plant pot 2 and a top level of fluid in the reservoir. To this end, outer pot may comprise at least one support 10, arranged at a height or distance from bottom 3 of outer pot 1 to be positioned above the though holes 7. Consequently, air and moisture may pass under inner plant pot 2 and over fluid in the reservoir.

Additionally or alternatively, outer pot 1 according to the present disclosure may comprise at least two spacers 11. In an embodiment with the at least one inner plant pot support 10, the spacers 11 should extend at least above the inner plant pot support 10, and may also extend below the supports 10 and may then also include steps 8 and through holes 7. In the shown embodiment, spacers 11 are defined by elongate indented ridges 11, extending generally axially along an inside of side wall 4, and protruding inward. The ridges 11 are optionally integrated in and moulded with side wall 4.

When spacers 11 define an upside-down frusto-conical shape in the interior of outer pot 1, inner plant pot supports 10 may be omitted, as inner plant pot 2 may then only sink onto the spacers 11 to a predetermined depth in outer pot 1, leaving a clearing between a bottom of inner plant pot 2 and fluid in the reservoir. Spacers 11 may define any other than frusto-conical shape corresponding with the exterior of inner plant pot 2, and in particular when the internal shape defined by spacers 11 is cylindrical, are supports 10 required to keep open the clearing between a bottom of inner plant pot 2 and fluid in the reservoir. With spacers 11 defining an accommodation for inner plant pot 2 having an internal shape corresponding with the external shape of inner plant pot 2, the shape of outer plant pot is immaterial, and may be cylindrical or any other shape. Nonetheless, in the shown embodiment, both inner plant pot 2 and outer pot 1 are of a upside-down turned frusto-conical shape.

In addition to, or as an alternative for the above disclosed air/moisture flow, based on through holes 7, air/moisture flows may be generated through the outside interior 12 of ridges 11 and/or through channels 13 along inside of side wall 4 between the inside of side wall 4, neighboring inward protruding ridges 11 and the exterior of an inserted inner plant pot 2.

It is noted that the spacers/ridges 11 are preferably radially thin in radial direction of outer pot 1, relative to the inscribed shape defined by the interior of side wall 4. When side wall 4 and spacers/ridges 11 are so shaped and dimensioned, relative to the inner plant pot, incident light from above can be blocked at least for the most part from falling through the channel into fluid in the reservoir.

As such, based on the above disclosure, both of (but at least one of) inner plant pot support 10 and through hole 7 are (is) comprised in an elongate inward indentation 11 of the side wall 4, formed by spacers/ridges 11, which extend in a lengthwise direction in parallel to a center axis 9 of outer pot 1. This indentation has a converging width W in a direction along side wall 4 away from bottom 3, and is open at bottom 3. This allows for compact and possibly even nested stacking of a plurality of outer pots 1.

Further, from the exterior of outer pot 1, spacers/ridges 11 define a recess, into which a label 30 may be inserted, for example for presenting information printed or written thereon about a plant in the inner pot 2 to a grower or end consumer. The label 30 may be inserted into recess of a spacer/ridge 11, along arrow A, as shown in FIG. 3. Depending on rigidity of such a label 30, it may clamp in the interior of the recess that is, from the outside of outer pot 1, defined by the spacer/ridge 11. As an additional or alternative feature, related to the label 30, a clip 31 may be provided as shown in FIG. 10 for presenting information to growers and/or consumers. The clip 31 may have two legs 33 extending in a deployed position of clip 31 in FIG. 10 over and engaging upper rim 24 of outer pot 1. Preferably, the legs 33 are spaced apart at a distance to enclose there between, in the interior of outer pot 1, a portion of one of the spacers/ridges 11, for improved fixation, at a beforehand known position.

Figure 13:
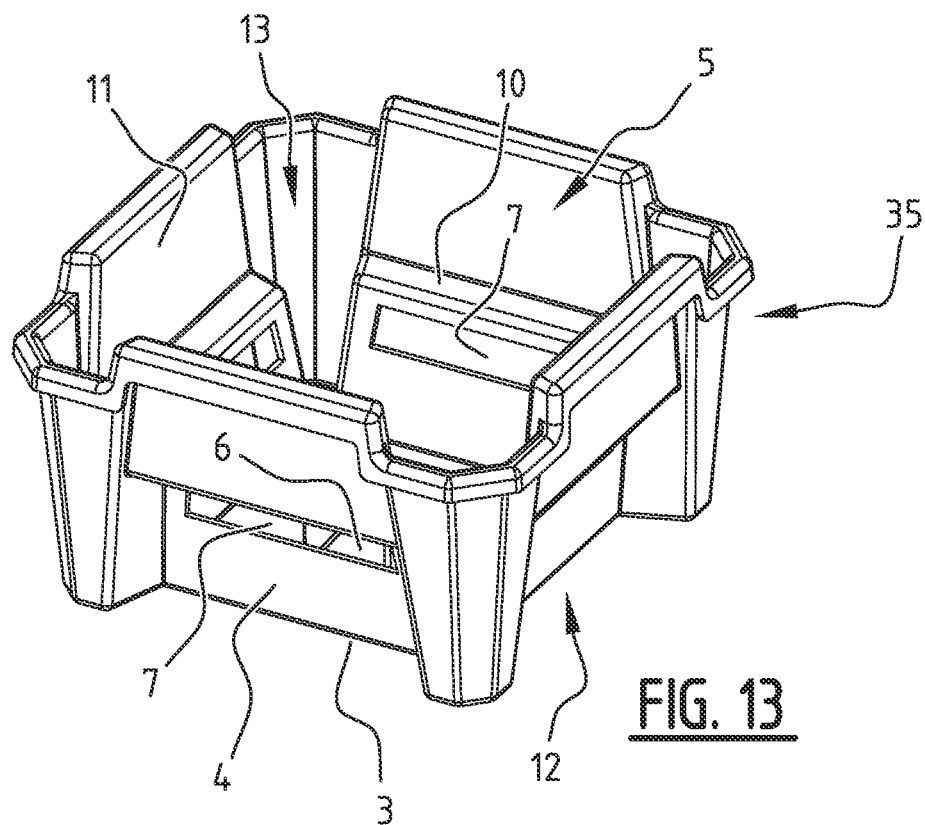
FIGS. 13 and 14 show an alternative approximately rectangular outer pot in respectively an empty and a filled state.
Figure 14:
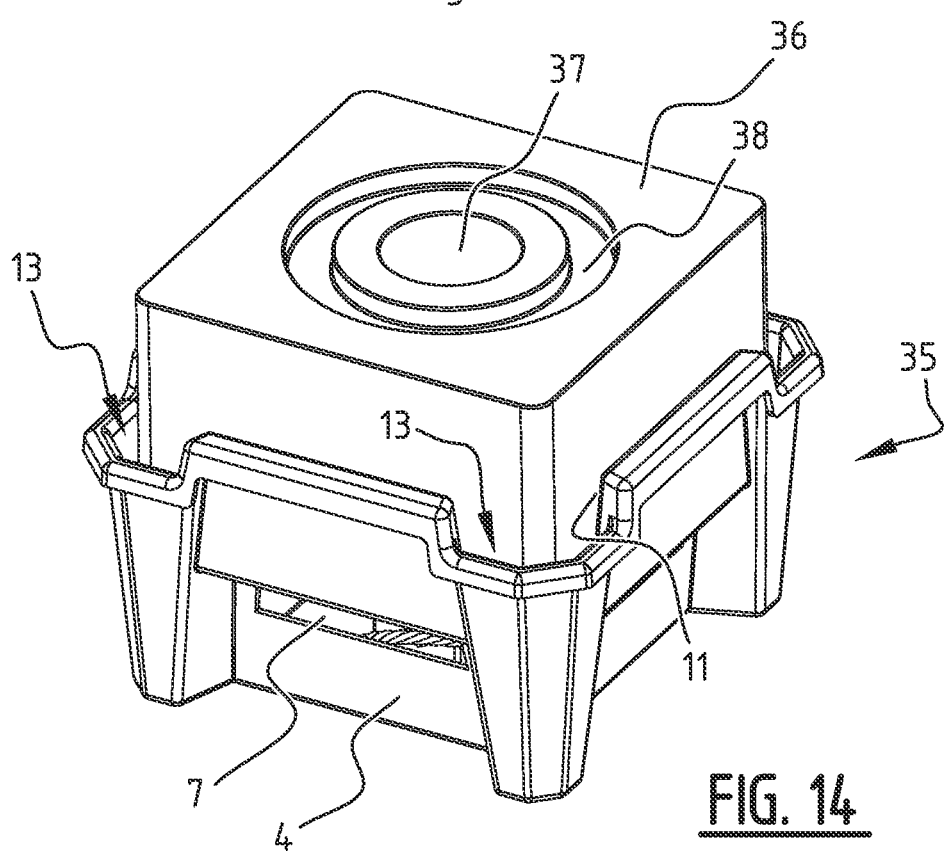

As shown in FIG. 6, an assembly of outer pot 1 and inner plant pot 2 further comprises a wick 14, which is arranged in the inner plant pot and extends through bottom of inner plant pot 2 to the reservoir above bottom 3 of outer pot 1. Wick 14 may be doubled back on itself, to provide a hold for a wick inserting device 15 with a hook 32 to support the wick 14 doubled back on itself, with which wick 14 may be inserted and anchored in an interior of inner plant pot 2. Wick inserting device 15 is in particular useful, when used to insert a wick 14 through a bottom of inner plant pot 2, when inner plant pot 2 is already filled with substrate. The wick inserting device 15 is not necessarily used, when the wick is pre-arranged through bottom of inner plant pot 2, before filing inner plant pot 2 with substrate. When wicks 14 are pre-arranged in inner pots 2, without wick inserting devices, inner plant pots may be compactly stacked or even nested, as shown schematically in FIG. 12. FIG. 11 shows a wick 14 in inner pot 2, which is held in place by substrate (not shown) in the interior of inner pot 2. When inner pot 2 is not (yet) filled with substrate, a plurality of inner pots 2 can be stacked in the manner of FIG. 12, with a portion of the doubled wicks 14 on and another portion of doubled wicks 14 under a bottom of inner pots 2, so that no space is lost, depending on a size of a foot 34 of inner pots 2, which is preferably designed/sized to comply with this requirement. Pre-wicked inner pots, loose or stacked, are considered an option and an invention in their own right, independent from the subject and features of the appended independent claim. Providing an inner plant pot and filling the inner plant pot with plant substrate may be simultaneously performed by providing a substrate having a sufficient self-carrying cohesion. Thereby, a separate inner pot may be omitted. This may in particular be the case, for example, when the substrate defines in itself the inner pot and a filling thereof, such as a block of stone wool, glass wool, a rigid or brittle material, such as floral foam, known under the brand or product name "oasis", and the like, for example as shown in FIGS. 13 and 14 and described herein below.

The outer pots 1 can be stacked using a stacker and/or individualized using a de-stacker, to promote automation, and compactly stacked pots allows for a reduction in transport space requirements and resulting costs.

Consequently, a method of assembling the assembly according to the present disclosure may involve providing an outer pot 1 of for instance FIGS. 1-5 and providing an inner plant pot 2 of for instance FIG. 6, filling inner plant pot 2 with plant substrate (not shown), and planting a plant in the substrate; and arranging inner plant pot 2 in the outer plant pot 1. In this method, wick 14 may be pre-arranged in inner plant pot 2, before filling with substrate. Alternatively, wick 14 is engaged using wick inserting device 15 and inserted into inner plant pot 2, for example through the bottom thereof, after filling inner plant pot 2 with substrate.

Further, the present disclosure relates to a method of growing plants with at least one assembly of outer pot 1 and inner plant pot 2, for example according to FIG. 6. This growing method may comprise providing the assembly in a generically or schematically represented ebb-and-flood system 16. The ebb-and-flood based watering system comprises a floor 17 and containment wall 18, in which a fluid level is selectively raised or lowered to respectively above and below through hole 7, indicated by double arrow B.

The water level is raised to replenish the reservoir and lowered to allow circulation and venting of air and moisture from the clearing or space between fluid in the reservoir and bottom of inner plant pot 2 through at least one of the through holes 7 and the channels or passages 12, 13.

The method may further involve heating floor 17 of the ebb-and-flood system 16 to promote the circulation and venting, as well as evaporation of liquid, in the interior of outer pot 1 and also from the water on or above the floor 17.

Figure 7:
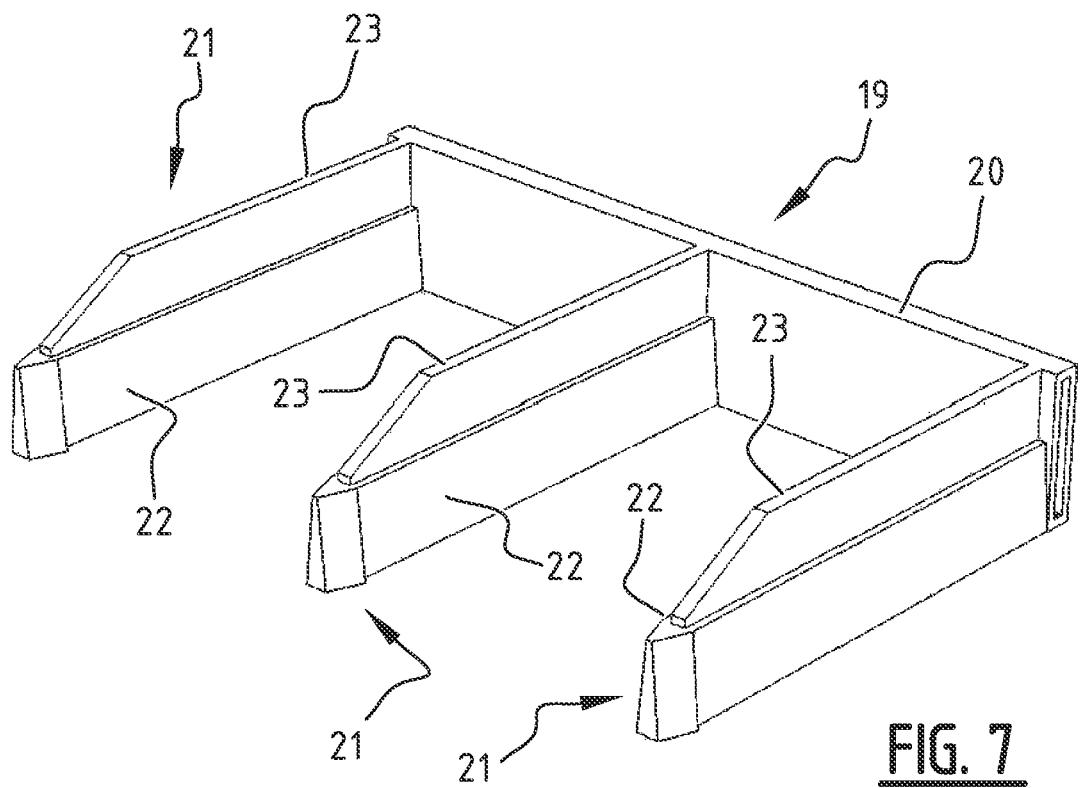
FIGS. 7, 8 and 9 show and embodiment of a pick-up fork for use in combination with at least the outer pot of any of the preceding figures
Figure 8:
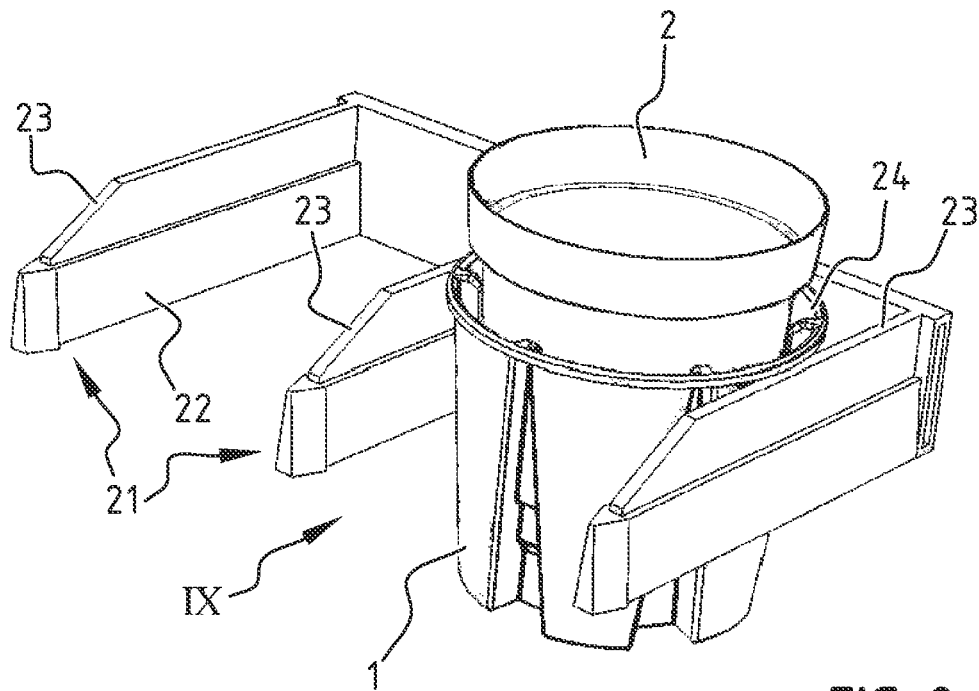

The method may further involve the use of a pick-up fork 19, shown in FIGS. 7 and 8, which is adapted to pick-up assemblies like the one of FIG. 6, and set these down at adjusted interspaces between the assemblies, different from or the same as the interspaces between assemblies before pick-up.

Pick-up fork 19 in FIGS. 7 and 8 comprises a base 20, which may be releasably attached to a vehicle, such as a truck and more in particular a fork-lift truck (not shown). This allows a method of the present disclosure to involve repositioning of outer pots 1, with or without inner plant pots arranged therein. To this end, one or more outer pots may be picked up at a time, displaced to another location, and set down again on a floor, which is part of the ebb-and-flood system. The fork 19 is thus configured to transport at least one outer pot 1 or an assembly of at lest one outer pot 1 with inserted inner plant pots 2.

Attached to base 20 is plurality of elongate teeth 21, which extend from base 20. Teeth 21 have sides relative to the longitudinal direction thereof, which are adapted to at least the outer shape of the outer pot 1. This may have one or more than one of several possible embodiments.

Figure 9:
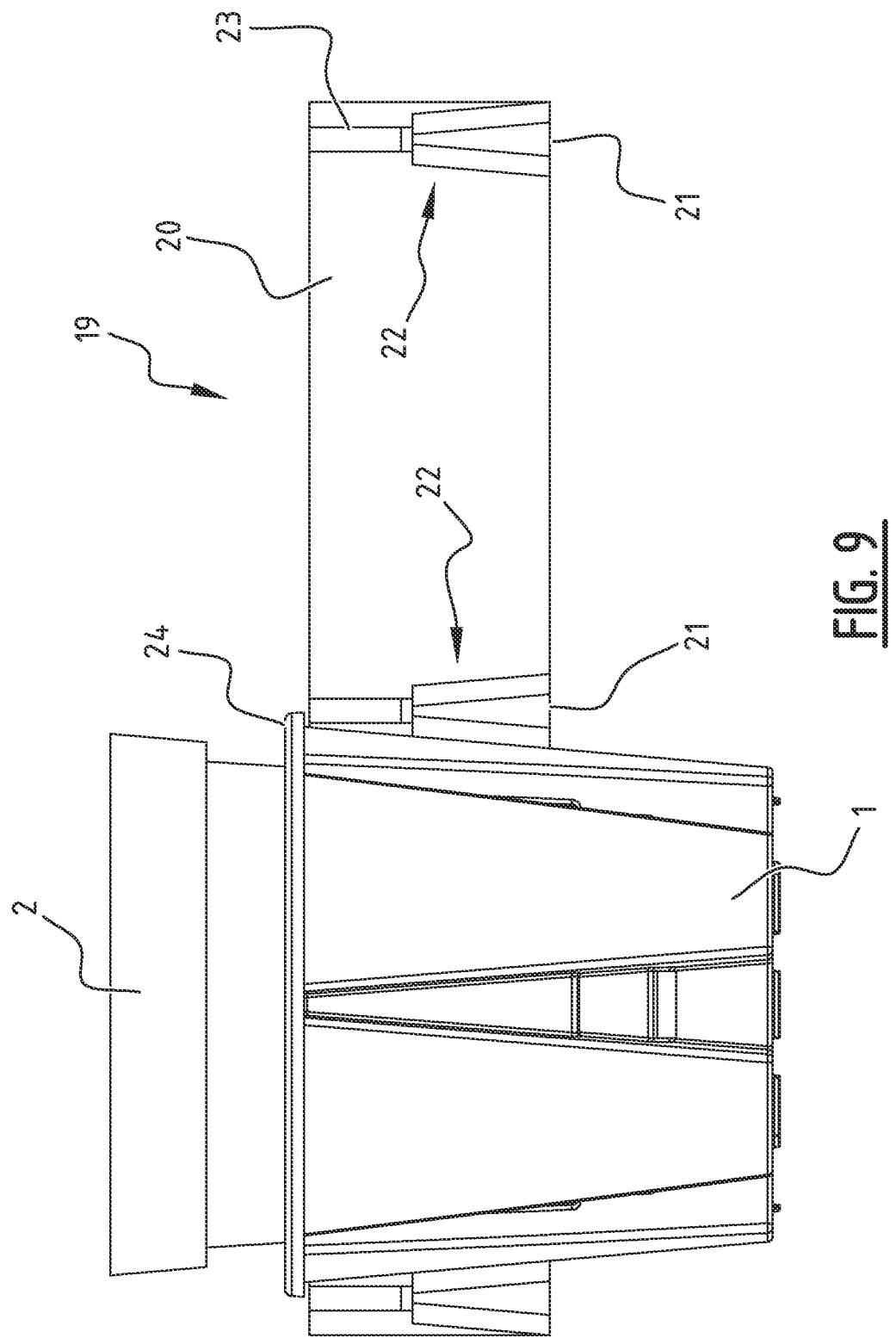

In a first embodiment, internally oriented sides 22 of neighboring teeth 21, i.e. facing one another, are straight or slanted in correspondence with respectively a cylindrical or upside down turned frusto-conical outer shape of the side wall of the outer pot. In the embodiment of FIG. 9, the outer pot 1 between neighboring teeth 21 has an upside down turned frusto-conical shape and the sides 22 of the teeth 21 are slanted correspondingly. Where the side wall of outer pot to define a cylindrical shape, the inner sides of teeth 21 would be straight (i.e. vertical).

The fork of this disclosure may, in an alternative embodiment, have a top edge of the teeth comprising an edge, configured to support a rim 24 at a top of outer pot 1. In the embodiment of FIGS. 7, 8 and 9, the top edge comprises a plate 23 supporting rim 24. The plate 23 is narrow in comparison with the width of underlying portions of tooth 21.

The present disclosure exhibits a number of advantages/benefits. For example, the combination of a space under inner plant pot 2 and above fluid in the reservoir combined with heating from floor 17 of ebb-and-flood system 16 allows for micro climate to be created and controlled, in particular also through channels and passages 12, 13 for aeration and moisturizing, but individual ones of the mentioned components may already contribute a beginning of such improvements. Consequently, plant growth may be promoted and conversely plant mortality may be reduced. Through holes 7 and channels and passages 12, 13 allow for escape of moisture from and airflow through the space under the inner plant pot 2 over the fluid in the reservoir, to prevent roots from becoming too moist, supply air to plants and also roots thereof and avoid the roots from becoming too moist. Fluid, in particular water, in the reservoir also forms a buffer, to protect plant from direct heating (which could affect root growth), when floor 17 of system 16 is heated, which could occur when inner plant pots 2 are to be set directly onto the floor 17 without intervening outer pots 1. This heating protection through the outer pot 1 and more in particular the reservoir at the bottom thereof, allows the floor 17 to be heated more, whereby more water or other fluid may be evaporated, to contribute even more to the above referenced micro climate or micro culture in particular, and improved plant growth in general, especially when rising heated moisture and air warm up the plant extending above the inner plant pots. Further, the reservoir absorbs heat radiated from the floor 17, before reaching the roots and substrate in inner plant pots 2.

Use of wicks promotes constant moisture content in substrate in inner plant pots 2, whereby roots of plants can develop without constantly having to adjust to changing moisture content in the substrate. The wick may regulate or adapt to a fluid need of the plant, corresponding with the amounts of evaporation of fluid from the reservoir. The ebb-and-flood based watering system allows that a sufficient amount of water may be available in the reservoirs of outer pots 1 through regular replenishing, and thus maintain the micro-culture practically for individual plant per inner plant pot 2 in outer pot 1.

FIG. 13 shows an alternative embodiment of an outer pot 35, having an approximately rectangular or even square shape in horizontal cross section, and FIG. 14 shows an assembly of this outer pot 35 and an inner pot 36.

Inner plant pot and filling thereof with plant substrate are simultaneously embodied by a single substrate block 36, having a sufficient self-carrying cohesion to be form-retaining when arranged in the outer pot 35. Thus, the inner pot may be defined by or incorporated in the substrate. Any sufficiently sturdy substrate block 36 may define in itself the inner pot and the filling thereof, such as a block 36 of stone wool, glass wool, a block of a rigid or brittle material, such as floral foam, known under the brand or product name "oasis", and the like.

Outer pot 35 comprises a bottom 3 and an at least approximately rectangular or square side wall 4, extending divergingly upward from bottom 3 to an opening 5. Opening 5 is configured and at least dimensioned to enable inserting the substrate block 36 defining inner plant pot 2 through the opening 5. Outer pot 35 is configured for use in an ebb-and-flood grow system, as is disclosed in more detail herein above. For this, bottom 3 and side wall 4 define there between and in a lower portion of the interior of outer pot 1 a fluid reservoir.

Outer pot 1 may comprise—in bottom 3 thereof—a dome 6 extending from bottom 3. Side wall 4 comprises at least one through hole 7 for fluid supply into or fluid discharge from the reservoir in the interior of outer pot 1. Additionally or alternatively, dome 6, of which a base is visible through hole 7 in FIG. 13, may comprise at least one through hole 7 in a top of dome 6 for fluid supply into or fluid discharge from the reservoir in the interior of outer pot 1. Through holes 7 in dome 6 or in side wall 4 are arranged at a distance from the bottom to define a volume of the reservoir.

Through holes 7 are arranged in side wall 4 below an inward oriented support 10 for substrate block 36 acting as the inner pot. Consequently, light incident onto outer pot 35 from above is blocked from falling through the through holes 7 into fluid in the reservoir by the support 10 overhanging the through holes 7, when viewed from the outside of the outer pot 35.

In the shown embodiment, the through holes 7 under supports 10 are rectangular. In contrast, hole or holes 7 may have any alternative one or combinations of shapes, such as circular, ellipsoid, and the like. Any shape for any of the through holes 7 is conceivable and may be put into practice.

In the shown embodiment, the through holes 7 are arranged and configured to pass an air flow between a bottom of the inner plant pot 2 and a top level of fluid in the reservoir. To this end, the at least one support 10 is arranged at a height or distance from bottom 3 of outer pot 35 to be positioned above the though holes 7. Consequently, air and moisture may pass under substrate block 36 defining the inner plant pot and over fluid in the reservoir.

Outer pot 35 according to the present disclosure comprises four spacers 11. In the shown embodiment, spacers 11 are defined by elongate indented ridges 11, extending generally axially along an inside of side wall 4, and protruding inward. The ridges 11 are optionally integrated in and moulded with side wall 4.

When spacers 11 define an upside-down frusto-pyramidical shape in the interior of outer pot 35, inner plant pot supports 10 may be omitted, as substrate block 36 may then only sink onto the spacers 11 to a predetermined depth in outer pot 35, leaving a clearing between a bottom of substrate block 36 and fluid in the reservoir. With spacers 11 defining an accommodation for substrate block 36 having an internal shape corresponding with the external shape of substrate block 36, the shape of outer plant pot is immaterial, and may be cylindrical or any other shape. Nonetheless, in the shown embodiment, both substrate block 36 and outer pot 35 are of a upside-down turned frusto-pyramidical shape.

Air and/or moisture flows may be generated through the outside interior 12 of ridges 11 and/or through channels 13 along inside of side wall 4 between the inside of side wall 4, neighboring inward protruding ridges 11 and the exterior of an inserted substrate block 36.

It is noted that the spacers/ridges 11 are preferably radially thin in radial direction of outer pot 35, relative to the inscribed shape defined by the interior of side wall 4. When side wall 4 and spacers/ridges 11 are so shaped and dimensioned, relative to the inner plant pot, incident light from above can be blocked at least for the most part from falling through the channel into fluid in the reservoir.

Although not shown in FIG. 14, an assembly of outer pot 35 and substrate block 36 may further comprises a wick, which is arranged in and the inner plant pot and extends through the bottom of substrate block 36 to the reservoir above bottom 3 of outer pot 1.

The substrate block 36 itself may comprise, in a top surface thereof, a hole or indentation 37, to accommodate a plant, seed, seedling or the like. Surrounding the centrally placed hole or indentation 37, a depressed ring 38 may be provided, which may act for a user to more conveniently supply water to the substrate block 36, which will then flow through the depressed ring to better surround the plant, seed, seedling or the like in the central hole or indentation 37.

In all, confidential tests have indicated that plant development for specific aspects of the present disclosure may be accelerated up to or more than 10-15%.

Based on the above description of specific and particular embodiments of the present disclosure, the scope of protection according to the appended claims has been substantiated, whereas clearly additional and/or alternative embodiments are possible, feasible and potentially desirable within the scope of protection according to those appended claims. Features of the specifically disclosed embodiments can not and should not result in limitation of the scope of protection thereto, unless defined in independent claims, whereas even the features defined in the appended independent claims can be replaced by obvious alternatives, in particular in some jurisdictions. The main objective of the present disclosure is to provide an improvement that is better suited to automated handling, where prior art devices less suitable therefore, and also yield faster plant development or growth and also achieve other benefits. Through the teaching of the present disclosure, a considerable improvement is provided.

The invention claimed is:

1. An outer pot, configured to accommodate an inner plant pot, where the outer pot comprises:
   a bottom; and
   at least one side wall extending from the bottom to an opening configured to enable inserting the inner plant pot through the opening;
      wherein the outer pot is configured for use in an ebb-and-flood grow system, in that:
      the bottom and the at least one side wall define there between a fluid reservoir;
      wherein the at least one side wall comprises at least one first through hole, wherein the at least one first through hole is configured for fluid supply to or fluid discharge from the outer pot, where the at least one first through hole is arranged at a distance from the bottom to define a volume of the reservoir; and
   at least one inner plant pot support; and
   at least two spacers above the at least one inner plant pot support, defining, with the inner plant pot on the at least one inner plant pot support, therebetween at least one open moisture and/or air channel along an inside of the at least one side wall and an outside of the inner plant pot,
      wherein the at least two spacers are defined by elongated inward indented ridges, wherein at least one ridge among the inward indented ridges has a first inward step and a second inward step, wherein an inner plant pot support among the at least one inner plant pot support is formed by the first inward step, and wherein a first through hole among the at least one first through hole is formed in the second inward step, wherein the first inward step is arranged at a higher distance from the bottom than the second inward step.

2. The outer pot according to claim 1, wherein the second inward step is oblique or transverse relative to a center axis of the outer pot to block incident light from falling through the through hole into fluid in the reservoir.

3. The outer pot according to claim 1, wherein the at least one first through hole is rectangular.

4. The outer pot according to claim 1, wherein the at least one first through hole is arranged and configured to pass an air flow through the clearing between the bottom of the inner plant pot and the fluid in the reservoir.

5. The outer pot according to claim 1, wherein the at least one side wall and the at least two spacers are shaped and dimensioned, relative to the inner plant pot, to block incident light from falling through the channel into fluid in the reservoir.

6. The outer pot according to claim 1, wherein the at least one inner plant pot support is arranged at a higher distance from the bottom than the at least one first through hole.

7. The outer pot according to claim 1, wherein at least one of the at least one inner plant pot support and the at least one first through hole is comprised in an elongate inward indentation of the at least one side wall, extending in a lengthwise direction in parallel to a center axis of the outer pot.

8. The outer pot according to claim 7, wherein the indentation has a converging width along the side wall away from the bottom, and is open at the bottom, for compact stacking of a plurality of outer pots.

9. The outer pot according to claim 1, further comprising a dome extending from the bottom, said dome being provided with a second through hole configured for fluid supply to or fluid discharge from the outer pot.

10. The outer pot according to claim 9, wherein the outer pot is provided with stands configured to provide a clearance between the bottom and a floor of the ebb-and-flood grow system to facilitate supply and/or discharge of air or fluid to/from the reservoir.

11. The outer pot according to claim 1, wherein the second inward step and the first through hole formed therein both extend farther radially inward relative to the center axis of the outer pot than the first inward step.

12. The outer pot according to 1, wherein the inward extended ridges extend above the at least one inner plant pot support relative to the bottom, and wherein the inward extended ridges extend in a lengthwise direction in parallel to the center axis of the outer pot, and wherein an indentation of the inward intended ridges has a converging width W in a direction along the at least one side wall away from the bottom and is open at the bottom.

13. The outer pot according to 1, wherein the second inward step is oblique or transverse relative to the center axis of the outer pot to block incident light from falling through the first through holes into fluid in the reservoir.

14. An assembly of the outer pot according to claim 1 and an inner plant pot.

15. The assembly according to claim 14, further comprising a wick arranged in the inner plant pot and extending from a bottom of the inner plant pot to the reservoir.

16. The assembly according to claim 14, further comprising a wick inserting device with which the wick is inserted and anchored in an interior of the inner plant pot.

17. A method of assembling the assembly according to claim 14, comprising:
   providing the outer pot;
   providing the inner plant pot;
   filling the inner plant pot with plant substrate, and planting a plant in the substrate; and
   arranging the inner plant pot in the outer pot.

18. The method according to claim 17, wherein a wick is pre-arranged in the inner plant pot, before filling with substrate.

19. The method according to claim 17, wherein a wick is engaged using a wick inserting device and is inserted into the inner plant pot after filling thereof with substrate.

20. A method of growing plants with an assembly according to claim 14, comprising:
   providing the assembly in an ebb-and-flood grow system in which a fluid level is selectively raised or lowered to respectively above and below the at least one first through hole;
   wherein the water level is raised to replenish the reservoir and lowered to allow circulation and venting of air and moisture from the space between fluid in the reservoir and the bottom of the inner plant pot through at least one of the at least one first through hole and the channel.

21. The method according to claim 20, further comprising heating a floor of the ebb-and-flood grow system to promote the circulation and venting.

* * * * *